(12) United States Patent
Park et al.

(10) Patent No.: US 10,693,668 B2
(45) Date of Patent: Jun. 23, 2020

(54) OPERATION METHOD OF COMMUNICATION NODE IN NETWORK

(71) Applicant: Hyundai Motor Company, Seoul (KR)

(72) Inventors: Seong Jin Park, Gyeonggi-Do (KR); Woo Sub Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 15/233,003

(22) Filed: Aug. 10, 2016

(65) Prior Publication Data

US 2017/0048158 A1 Feb. 16, 2017

(30) Foreign Application Priority Data

Aug. 12, 2015 (KR) .................... 10-2015-0113593

(51) Int. Cl.
*H04L 12/18* (2006.01)
*H04L 12/911* (2013.01)
*H04L 29/08* (2006.01)

(52) U.S. Cl.
CPC .............. *H04L 12/18* (2013.01); *H04L 47/72* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 2002/0037014 A1* | 3/2002 | Myojo | .............. | H04W 74/0816 370/437 |
| 2004/0145516 A1* | 7/2004 | Large | .............. | G01S 19/04 342/357.27 |
| 2006/0109855 A1* | 5/2006 | Rodrigo | .............. | H04L 12/423 370/404 |
| 2007/0198144 A1* | 8/2007 | Norris | .............. | B60T 7/22 701/23 |
| 2009/0010156 A1* | 1/2009 | Song | .............. | H04L 12/2803 370/230 |
| 2009/0049175 A1* | 2/2009 | Finn | .............. | H04L 12/462 709/226 |
| 2009/0239554 A1* | 9/2009 | Sammour | .............. | H04W 4/12 455/458 |
| 2010/0039969 A1* | 2/2010 | Sukenari | .............. | H04W 52/325 370/310 |
| 2010/0220692 A1* | 9/2010 | Diab | .............. | H04J 3/0641 370/336 |
| 2011/0261708 A1* | 10/2011 | Grandhi | .............. | H04W 4/06 370/252 |
| 2012/0327870 A1* | 12/2012 | Grandhi | .............. | H04W 28/06 370/329 |
| 2013/0159531 A1* | 6/2013 | Katyal | .............. | H04W 28/20 709/226 |
| 2014/0022938 A1* | 1/2014 | Olsen | .............. | H04L 29/06333 370/254 |
| 2014/0092860 A1* | 4/2014 | Kneckt | .............. | H04W 72/1205 370/329 |

* cited by examiner

*Primary Examiner* — Thinh D Tran
(74) *Attorney, Agent, or Firm* — Mintz Levin Cohn Ferris Glovsky and Popeo, P.C.; Peter F. Corless

(57) ABSTRACT

An operation method of a communication node in an Ethernet-based vehicle network includes: transmitting a first frame advertising a presence of a data unit to be transmitted; receiving a second frame indicating that preparation for receiving the data unit is completed; and transmitting a third frame including the data unit using a static bandwidth which is reserved through an exchange of the first frame and the second frame.

19 Claims, 6 Drawing Sheets

OPERATION METHOD OF COMMUNICATION NODE IN NETWORK

CROSS-REFERENCE TO RELATED APPLICATIONS

This application claims the benefit of and priority to Korean Patent Application No. 10-2015-0113593 filed on Aug. 12, 2015 in the Korean Intellectual Property Office (KIPO), the entire contents of which are hereby incorporated by reference.

BACKGROUND

1. Technical Field

The present disclosure relates generally to an operation of a communication node in a network, and more specifically, to a technique for reserving bandwidth used for transmitting and receiving a frame.

2. Description of the Related Art

Along with the rapid digitalization of vehicle parts, the number and variety of electronic devices installed within a vehicle have been increasing significantly. Electronic devices may currently be used throughout the vehicle, such as in a power train control system, a body control system, a chassis control system, a vehicle network, a multimedia system, and the like. The power train control system may include an engine control system, an automatic transmission control system, etc. The body control system may include a body electronic equipment control system, a convenience apparatus control system, a lamp control system, etc. The chassis control system may include a steering apparatus control system, a brake control system, a suspension control system, etc. The vehicle network may include a controller area network (CAN), a FlexRay-based network, a media oriented system transport (MOST)-based network, etc. The multimedia system may include a navigation apparatus system, a telematics system, an infotainment system, etc.

Such systems and electronic devices constituting each of the systems are connected via the vehicle network, which supports functions of the electronic devices. For instance, the CAN may support a transmission rate of up to 1 Mbps and may support automatic retransmission of colliding messages, error detection-based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system, the infotainment system, as well as enhanced safety systems of a vehicle require higher transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet-based network may be considered as a vehicle network. The Ethernet-based network may support bi-directional communication through one pair of windings and may support a transmission rate of up to 10 Gbps.

In an Ethernet-based network, an electronic device may reserve bandwidth for transmitting a frame including a data unit and may transmit the frame to other electronic devices through the reserved bandwidth. However, the electronic device needs to reserve bandwidth whenever transmitting a corresponding frame, thus causing a frame transmission delay by the amount of time spent for a bandwidth reservation procedure. In other words, this may cause performance degradation of the Ethernet-based vehicle network.

SUMMARY

Accordingly, embodiments of the present disclosure are provided to substantially obviate one or more problems due to limitations and disadvantages of the related art. Embodiments of the present disclosure provide a method for reserving bandwidth used for transmitting and receiving a frame, a method of disabling the reservation of bandwidth used for transmitting and receiving a frame, and a method of enabling the reservation of bandwidth used for transmitting and receiving a frame.

In accordance with the embodiments of the present disclosure, an operation method of communication node in an Ethernet-based vehicle network includes: transmitting a first frame advertising a presence of a data unit to be transmitted; receiving a second frame indicating that preparation for receiving the data unit is completed; and transmitting a third frame including the data unit using a static bandwidth which is reserved through an exchange of the first frame and the second frame.

The data unit may be generated based on an audio video bridge (AVB) protocol.

The first frame may be transmitted in a multicast manner or a broadcast manner.

Also, the first frame may include information requesting a reservation of the static bandwidth.

The communication node may be an end node in the Ethernet-based vehicle network. The first frame, the second frame, and the third frame may be transmitted and received through a switch connected to the end node.

The operation method may further include receiving a fourth frame indicating that a reservation of the static bandwidth is disabled; and stopping a transmission of the third frame through the static bandwidth when the fourth frame is received.

The fourth frame may include information indicating a period in which the reservation of the static bandwidth is disabled.

The operation method may further include receiving a fifth frame indicating that the reservation of the static bandwidth is enabled; and restarting the transmission of the third frame through the static bandwidth when the fifth frame is received.

The fifth frame may include information indicating a time at which the reservation of the static bandwidth is enabled.

Furthermore, in accordance with the embodiments of the present disclosure, an operation method of communication node in an Ethernet-based vehicle network includes: generating a first frame requesting that a reservation of a static bandwidth is disabled, the static bandwidth being used for transmitting and receiving a data unit; and transmitting the first frame to a plurality of communication nodes in the Ethernet-based vehicle network that transmit and receive the data unit.

The data unit may be generated based on an audio video bridge (AVB) protocol.

The first frame may include information indicating a period in which the reservation of the static bandwidth is disabled.

The communication node may be a switch, and each of the plurality of communication nodes may be an end node in the Ethernet-based vehicle network connected to a switch.

The operation method may further include generating a second frame requesting that the reservation of the static bandwidth is enabled; and transmitting the second frame to the plurality of communication nodes.

The second frame may include information indicating a time at which the reservation of the static bandwidth is enabled.

Furthermore, in accordance with the embodiments of the present disclosure, an operation method of a communication node in an Ethernet-based vehicle network includes: receiving a first frame advertising a presence of a data unit to be transmitted; transmitting a second frame indicating that preparation for receiving the data unit is completed; and receiving a third frame including the data unit using a static bandwidth which is reserved through an exchange of the first frame and the second frame.

The data unit may be generated based on an audio video bridge (AVB) protocol.

The first frame may include information requesting a reservation of the static bandwidth.

The operation method may further include receiving a fourth frame requesting that the reservation of the static bandwidth is disabled.

The operation method may further include receiving a fifth frame requesting that the reservation of the static bandwidth is enabled; and restarting a transmission of the third frame through the static bandwidth when the fifth frame is received.

BRIEF DESCRIPTION OF DRAWINGS

Embodiments of the present disclosure will become more apparent by describing in detail exemplary embodiments of the present disclosure with reference to the accompanying drawings, in which.

Figure 1:
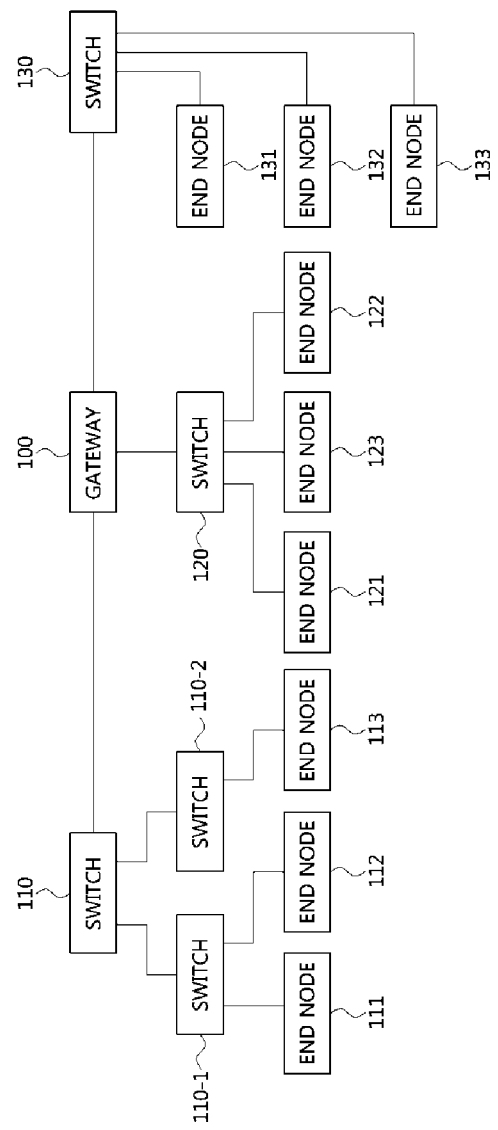
FIG. 1 is a diagram illustrating a vehicle network topology according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although embodiments are described herein as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several embodiments, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a diagram showing a vehicle network topology according to embodiments of the present disclosure.

As shown in FIG. 1, a communication node may include a gateway, a switch (or bridge), or an end node. The gateway 100 may be connected with at least one switch 110, 110-1, 110-2, 120, and 130 and may be configured to connect different networks. For example, the gateway 100 may connect a switch that supports a controller area network (CAN) (e.g., FlexRay, media oriented system transport (MOST), or local interconnect network (LIN)) protocol and a switch that supports an Ethernet protocol. Each of the switches 110, 110-1, 110-2, 120, and 130 may be connected with at least one end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and operate at least one of end nodes connected to the switch.

The end nodes 111, 112, 113, 121, 122, 123, 131, 132, and 133 may include an electronic control unit (ECU) configured to operate various types of devices mounted within a vehicle. For example, the end nodes 111, 112, 113, 121, 122, 123, 131, 132, and 133 may include an ECU configured to operate an infotainment device (e.g., a display device, a navigation device, and an around view monitoring device).

Communication nodes (e.g., a gateway, a switch, an end node, or the like) included in a vehicle network may be connected in a star topology, bus topology, ring topology, tree topology, mesh topology, etc. In addition, the communication nodes of the vehicle network may support a CAN protocol, FlexRay protocol, MOST protocol, LIN protocol, or Ethernet protocol. Exemplary embodiments of the present disclosure may be applied to the above-described network topologies. The network topology to which exemplary embodiments of the present disclosure may be applied is not limited thereto and may be configured in various ways.

Figure 2:
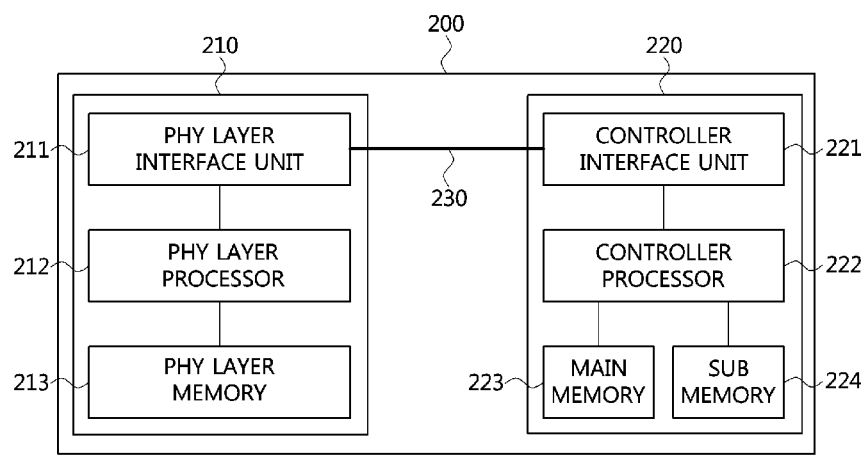
FIG. 2 is a diagram illustrating a communication node constituting a vehicle network according to embodiments of the present disclosure.

FIG. 2 is a diagram showing a communication node constituting a vehicle network according to embodiments of the present disclosure. Notably, the various methods discussed herein below may be executed by a controller having a processor and a memory.

As shown in FIG. 2, a communication node 200 of a network may include a PHY layer block 210 and a controller 220. In addition, the communication node 200 may further include a regulator (not shown) for supplying power. In particular, the controller 220 may be implemented to include a medium access control (MAC) layer. A PHY layer block 210 may be configured to receive or transmit signals from or to another communication node. The controller 220 may be configured to operate the PHY layer block 210 and perform various functions (e.g., an infotainment function). The PHY layer block 210 and the controller 220 may be implemented as one system on chip (SoC) or alternatively, may be implemented as separate chips.

Further, the PHY layer block 210 and the controller 220 may be connected via a media independent interface (MII) 230. The MII 230 may include an interface defined in the IEEE 802.3 and may include a data interface and a management interface between the PHY layer block 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer block 210 may include a PHY layer interface unit 211, a PHY layer processor 212, and a PHY layer memory 213. The configuration of the PHY layer block 210 is not limited thereto, and the PHY layer block 210 may be configured in various ways. The PHY layer interface unit 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface unit 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller 220 may be configured to monitor and operate the PHY layer block 210 using the MII 230. The controller 220 may include a controller interface 221, a controller processor 222, a main memory 223, and a sub memory 224. The configuration of the controller 220 is not limited thereto, and the controller 220 may be configured in various ways. The controller interface 221 may be configured to receive a signal from the PHY layer block 210 (e.g., the PHY layer interface 211) or an upper layer (not shown), transmit the received signal to the controller processor 222, and transmit the signal received from the controller processor 222 to the PHY layer block 210 or upper layer. The controller processor 222 may further include an independent memory control logic or an integrated memory control logic for operating the controller interface 221, the main memory 223, and the sub memory 224. The memory control logic may be implemented to be included in the main memory 223 and the sub memory 224 or may be implemented to be included in the controller processor 222.

Furthermore, each of the main memory 223 and the sub memory 224 may be configured to store a signal processed by the controller processor 222 and may be configured to output the stored signal based on a request from the controller processor 222. The main memory 223 may be a volatile memory (e.g., a random access memory (RAM)) configured to temporarily store data required for the operation of the controller processor 222. The sub memory 224 may be a non-volatile memory in which an operating system code (e.g., a kernel and a device driver) and an application program code for performing a function of the controller 220 may be stored. A flash memory having a high processing speed or a hard disc drive (HDD) or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
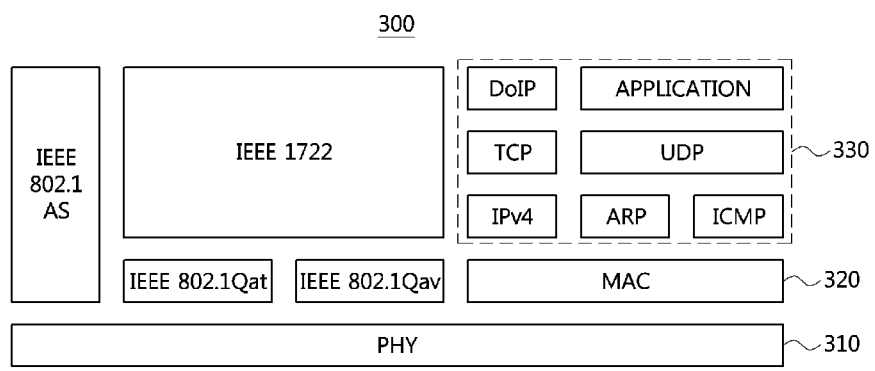
FIG. 3 is a diagram illustrating the protocol layers of a communication node constituting a vehicle network according to embodiments of the present disclosure.

FIG. 3 is a diagram illustrating the protocol layers of a communication node constituting a vehicle network according to embodiments of the present disclosure.

As shown in FIG. 3, a communication node 300 may include a physical (PHY) layer 310, a medium access control (MAC) layer 320, and an upper layer 330. The communication node 300 may have the same structure as the communication node 200 described with FIG. 2. The PHY layer 310 may support a transmission speed of 100 Mbps, and a various transmission speeds (e.g., 1 Gbps, etc.). It should be understood that the transmission speed supported by the PHY layer 310 is not limited to the transmission speed described here.

The MAC layer 320 may operate based on IEEE 802.1AS protocol, IEEE 802.1Qat protocol (i.e., stream reservation protocol (SRP)), and IEEE 802.1Qav protocol (i.e., a traffic shaping related protocol). The upper layer 330 may include, for instance, IPv4, address resolution protocol (ARP), internet control message protocol (ICMP), transmission control protocol (TCP), user datagram protocol (UDP), diagnostic communication over internet protocol (DoIP), and applications. The upper layer 330 may operate based on IEEE 802.1AS protocol and IEEE 1722 protocol (i.e., audio video transport protocol (AVTP)).

A method performed by a communication node and a corresponding counterpart communication node in a vehicle network will be described below. Although a method (e.g., signal transmission or reception) performed by a first communication node will be described below, a second communication node that corresponds thereto may perform a method (e.g., signal reception or transmission) corresponding to the method performed by the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Figure 4:
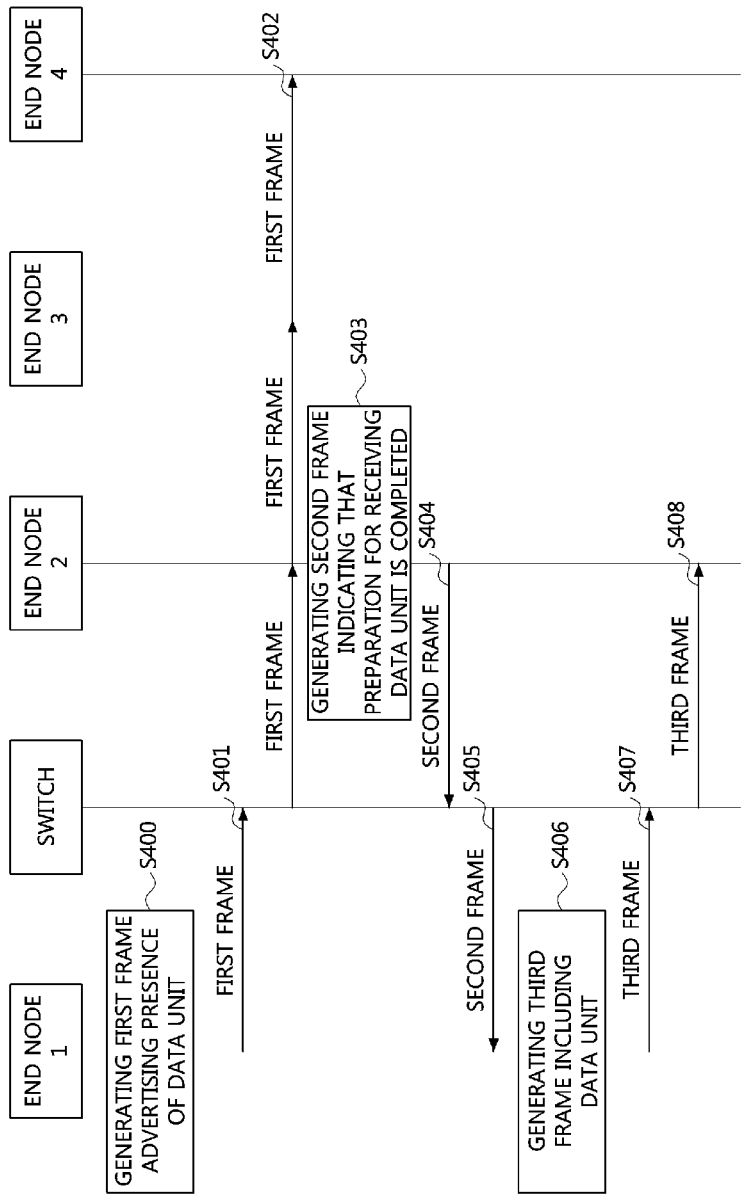
FIG. 4 is a sequence chart illustrating an operation method of a communication node according to an exemplary embodiment of the present disclosure.

FIG. 4 is a sequence chart illustrating an operation method of a communication node according to embodiments of the present disclosure.

As shown in FIG. 4, a switch, an end node 1, an end node 2, an end node 3, and an end node 4 may constitute the Ethernet-based vehicle network described in FIG. 1. The switch may be construed as a bridge. Each of the end node 1, the end node 2, the end node 3, and the end node 4 may include the structure of the communication node 200 described in FIG. 2 and the protocol layers of the communication node 300 described in FIG. 3. The switch may be connected to the end node 1 through a port 1 (not shown), connected to the end node 2 through a port 2, connected to the end node 3 through a port 3, and connected to the end node 4 through a port 4. The switch may also be connected to another switch or a gateway through a port 5. Further, the end node 1 may be construed a talker and each of end node 2, end node 3, and end node 4 may be construed as a listener. The switch, the end node 1, the end node 2, the end node 3, and the end node 4 may constitute an audio video bridge (AVB) domain.

The end node 1 may generate a first frame advertising a presence of a data unit to be transmitted in case there is a data unit to be transmitted (S400). The data unit may be construed as a data unit generated according to AVB protocol (hereinafter, "AVB data unit"). Furthermore, the first frame may be construed as a frame performing an advertising function defined in SRP. The first frame may have a structure described in the following.

Figure 5:
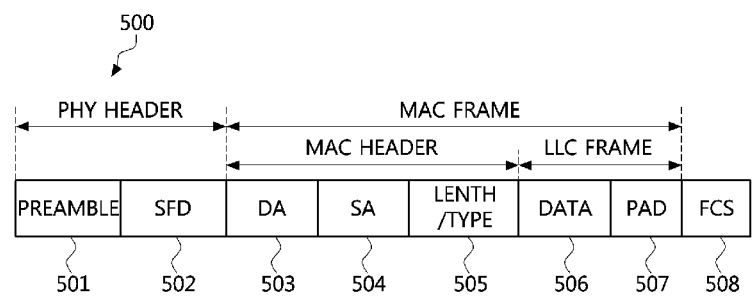
FIG. 5 is a diagram illustrating a frame used in an Ethernet-based vehicle network according to embodiments of the present disclosure.

FIG. 5 is a diagram illustrating a frame used in an Ethernet-based vehicle network according to embodiments of the present disclosure;

As shown in FIG. 5, an Ethernet protocol based frame 500 may include a PHY header, a MAC frame, and a frame check sequence (FCS) field 508. The MAC frame may be generated by the controller 220 in the communication node. The PHY header may include a preamble field 501 and a start frame delimiter (SFD) field 502. The preamble 501 may be the size of about 7 octets and be used for timing synchronization. The SFD field 502 may be a size of about 1 octet and have the sequence of "10101011."

The MAC frame may be located behind the SFD field 502. In addition, the MAC frame may include a header, or include a MAC header and a logic link control (LLC) frame. The MAC header may include a destination address (DA) field 503, a source address (SA) field 504 and a length/type field 505. The DA field 503 may be a size of about 6 octets and may include identification information (e.g., a MAC address) regarding the communication node that receives the MAC frame. The SA field 504 may be a size of about 6 octets and may include identification information (e.g., a MAC address) regarding the communication node that transmits the MAC frame.

Further, the length/type field 505 may have a length of about 2 octets and may indicate an Ethernet type supported by a communication node that transmits the protocol-based frame 500. For example, when a first octet value included in the length/type field 505 is less than or equal to the decimal value 1500, the length/type field 505 may indicate the length of the data field 506. When the first octet value included in the length/type field 505 is equal to or greater than the decimal value 1536, the length/type field 505 may indicate an Ethernet type. The LLC frame may include the data field 506 and a pad field 507 when necessary (e.g., to satisfy a minimum size of the MAC frame). In particular, the pad field 507 may be added behind the data field 506.

Referring back to FIG. 4, the SA field of the first frame may include identification information of the end node 1 or an identification information of a data unit transmitted from the end node 1. The identification information may indicate a MAC address of the end node 1 or a newly defined identifier (ID). Further, the newly defined ID may have a size of 2 octets. The first frame may further include requirements for transmitting and receiving a data unit.

For example, the requirements may include at least one of information indicating a reservation of a fixed bandwidth (or, static bandwidth), the size of bandwidth to be reserved, the maximum size of a frame including a data unit, the maximum interval between frames including data units, a priority of the data unit (e.g., priority code point (PCP) tag), a rank indicating an emergency stream (i.e., a stream including a data unit), a non-emergency stream, and a transmission latency. In addition, the requirements may be included in at least one of a MAC header and a data field(s) of the first frame.

The end node 1 may transmit the first frame based on a multicast manner or a broadcast manner (S401). The switch may receive the first frame from the end node 1 and transfer the first frame to the end nodes connected with the switch (i.e., the end node 2, the end node 3, and the end node 4) (S402). Each of the end node 1, the end node 2, the end node 3, and the end node 4 may receive the first frame from the switch and determine whether to receive a data unit based on the requirements contained in the first frame.

Each of the end node 3 and the end node 4 may generate a frame including information indicating being unable to receive a data unit in case it is determined that it is not possible to receive a data unit based on the requirements contained in the first frame. In addition, the end node 3 and the end node 4 may determine itself to be unable to receive a data unit in case data reservation for transmitting a data unit is not possible. Each of the end node 3 and the end node 4 may transmit the generated frame to the switch. The switch may receive the frame from the end node 3 and the end node 4 and transfer the received frame to the end node 1. The end node 1 may receive the frame through the switch and determine that each of the end node 3 and the end node 4 is in a state of being unable to receive a data unit based on information contained in the received frame. The steps of generating and transmitting a frame including information indicating unable to receive a data unit may be omitted.

The end node 2 may generate a second frame including information indicating that a preparation for receiving a data unit is completed in case it is determined that it is possible to receive a data unit based on the requirements contained in the first frame (S403). Further, the end node 2 may determine itself to be able to receive a data unit in case a reservation for transmitting and receiving a data unit is possible. The structure of the second frame may be the same as the structure of a frame described with FIG. 4. The second frame may include information indicating that the preparation for receiving a data unit is completed and the information may be included in at least one of the MAC header and the data fields of the second frame. The end node 2 may transmit the second frame to the switch (S404). The switch may receive the second frame from the end node 2 and transfer the second frame to the end node 1 (S405). The end node 1 may receive the second frame from the switch.

In case the exchange of the first frame and the second frame is successfully completed, each of the end node 1, the end node 2, and the switch may determine that the bandwidth to be used for transmitting and receiving a data unit has been reserved. Specifically, a bandwidth with a size corresponding to the size by indicated information included in the first frame may be reserved. Alternatively, in case that the information indicating the size of the bandwidth to be reserved is not included in the first frame, the total bandwidth may be reserved on a transmission route of "end node 1—switch—end node 2." In addition, a bandwidth may be statically reserved for transmitting and receiving a data unit. The bandwidth statically reserved for transmitting and receiving a data unit (especially, AVB a data unit) may be called a "static bandwidth." The end node 1 may transmit a data unit using a pre-reserved static bandwidth, not reserving a bandwidth whenever transmitting a data unit. Further, the static bandwidth may be exclusively used for transmitting and receiving a data unit that is generated based on the same protocol as the protocol to which the data unit belongs. In other words, the static bandwidth may be exclusively used for transmitting and receiving an AVB data unit.

For instance, by the exchange procedure between the first frame and the second frame described above, 70% of the total bandwidth may be reserved for transmitting and receiving a data unit on the transmission route of "end node 1—switch—end node 2" and the other 30% of the total bandwidth may be reserved for transmitting and receiving other information. Particularly, a third frame including a data unit with a period of 70 μsec out of 100 μsec of the total transmission period may be transmitted or received on the transmission route of "end node 1—switch—end node 2" whereas, during the period of the other 30 μsec, another frame (e.g., a frame generated based on TCP/IP) may be transmitted or received. The size of the static bandwidth is not limited to the bandwidth described here, and various sizes of the static bandwidth may be reserved for transmitting and receiving a data unit.

Upon the completion of the reservation of the static bandwidth, the end node 1 may generate a third frame including a data unit (S406). Specifically, the end node 1 may generate a third frame based on the size of the static bandwidth. For example, the end node 1 may generate a third frame having the size corresponding to 70 μsec out of 100 μsec of the transmission period, in case 70% of the total bandwidth is used for the static bandwidth. The structure of the third frame may be the same as the frame described with FIG. 4. The end node 1 may transmit the third frame to the switch through the static bandwidth (S407). The switch may receive the third frame from the end node 1 and transmit the third frame to the end node 2 through the static bandwidth (S408). The end node 2 may receive the third frame from the switch through the static bandwidth.

Meanwhile, a request for transmitting and receiving another frame (e.g., a network diagnosis related frame, a reprogramming related frame) demanding the total bandwidth may be requested when the static bandwidth is already reserved. In this case, the static bandwidth may not be used for another frame even if the third frame is not transmitted or received through the static bandwidth, since the static bandwidth is exclusively used for transmitting and receiving the third frame. Thus, a disabling method of the static bandwidth reservation may be needed.

Figure 6:
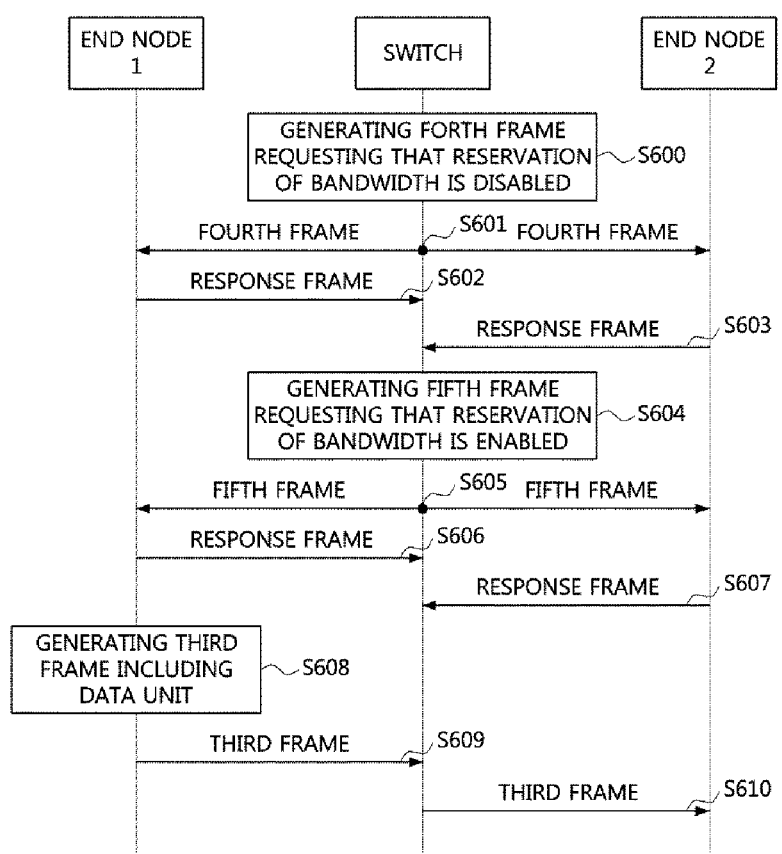
FIG. 6 is a sequence chart illustrating an operation method of a communication node according to embodiments of the present disclosure.

FIG. 6 is a sequence chart illustrating an additional operation method of a communication node according to embodiments of the present disclosure. The operation method of a communication node described in FIG. 6 may be performed after the operation method of a communication node described in FIG. 4.

As shown in FIG. 6, the switch may generate a fourth frame indicating disabling of the reservation of the static bandwidth in case there is a request for transmitting and receiving of another frame that uses the total bandwidth (S600). The structure of the fourth frame may be the same as the frame described with FIG. 4. The fourth frame may include information requesting that the reservation of the static bandwidth is disabled and further include information indicating a period in which the reservation of the static bandwidth is disabled. Such information may be included in at least one of the MAC header and the data fields of the fourth frame.

Meanwhile, the switch may transmit the fourth frame to the end node 1 and the end node 2 which are communication nodes transmitting and receiving the third frame (S601). Alternatively, the switch may transmit the fourth frame to the end node 1. In addition, the switch may transmit the fourth frame through a bandwidth other than the static bandwidth. The end node 1 may receive the fourth frame from the switch and transmit a response frame (i.e., an acknowledgement (ACK) frame) in response to the fourth frame to the switch (S602). The end node 1 may transmit the response frame to the switch through a bandwidth other than the static bandwidth. However, the step of transmitting the response frame (S602) may be omitted. The end node 1 may identify that the reservation of the static bandwidth needs to be disabled based on the information included in the fourth frame. Thus, the end node 1 may stop a transmission of the third frame through the static bandwidth. Furthermore, the end node 1 may identify, based on the information included in the fourth frame, the period in which the reservation of the static bandwidth is disabled and may stop the transmission of the third frame in the period. The end node 1 may restart the transmission of the third frame through the static bandwidth after the period expires.

The end node 2 may receive the fourth frame from the switch and transmit a response frame (i.e., an ACK frame) in response to the fourth frame to the switch (S603). In addition, the end node 2 may transmit the response frame to the switch through a bandwidth other than the static bandwidth. However, the step of transmitting the response frame (S603) may be omitted. The end node 2 may identify that the reservation of the static bandwidth needs to be disabled based on the information included in the fourth frame. Furthermore, the end node 2 may identify the period, in which the reservation of the static bandwidth is disabled, based on the information included in the fourth frame.

Meanwhile, when transmission and reception operations of other frame are completed, the switch may generate the fifth frame indicating that the reservation of the static bandwidth is enabled (S604). The structure of the fifth frame may be the same as the structure of the frame described in FIG. 5. The fifth frame may have information indicating that the reservation of the static bandwidth is enabled and may further include information indicating a time at which the reservation of the static bandwidth is enabled. Such information may be included in at least one of the MAC header and the data fields of the fifth frame.

The switch may transmit the fifth frame to the end node 1 and the end node 2 which are communication nodes transmitting and receiving the third frame (S605). Alternatively, the switch may transmit the fifth frame to the end node 1. In addition, the switch may transmit the fifth frame through a bandwidth other than the static bandwidth. The end node 1 may receive the fifth frame from the switch and transmit a response frame (i.e., an ACK frame) in response to the fifth frame to the switch (S606). The end node 1 may transmit the response frame to the switch through a bandwidth other than the static bandwidth. However, the step of transmitting the response frame (S606) may be omitted. The end node 1 may identify that the reservation of the static bandwidth needs to be enabled based on the information included in the fifth frame. Thus, the end node 1 may restart the transmission of the third frame through the static bandwidth. Furthermore, the end node 1 may identify the time at which the reservation of the static bandwidth is enabled based on the information included in the fifth frame and may restart the transmission of the third frame through the static bandwidth at the time.

The end node 2 may receive the fifth frame from the switch and transmit a response frame (i.e., an ACK frame) in response to the fifth frame to the switch (S607). In addition, the end node 2 may transmit the response frame to the switch through a bandwidth other than the static bandwidth. However, the step of transmitting the response frame (S607) may be omitted. The end node 2 may identify that the reservation of the static bandwidth needs to be enabled based on the information included in the fifth frame. Furthermore, the end node 2 may identify the time of enabling the reservation of the static bandwidth based on the information included in the fifth frame.

After the reservation of the static bandwidth is enabled, the end node 1 may generate a third frame including a data unit (S608) and transmit the third frame to the switch through the static bandwidth (S609). The switch may receive the third frame from the end node 1 and transmit the third frame to the end node 2 through the static bandwidth (S610). The end node 2 may receive the third frame from the switch through the static bandwidth.

Meanwhile, in case that a part of the static bandwidth needs to be used for transmitting and receiving another frame, the static bandwidth may not be used by another frame since the static bandwidth is exclusively used for transmitting and receiving the third frame. Thus, a method for adjusting a size of the static bandwidth may be needed.

Figure 7:
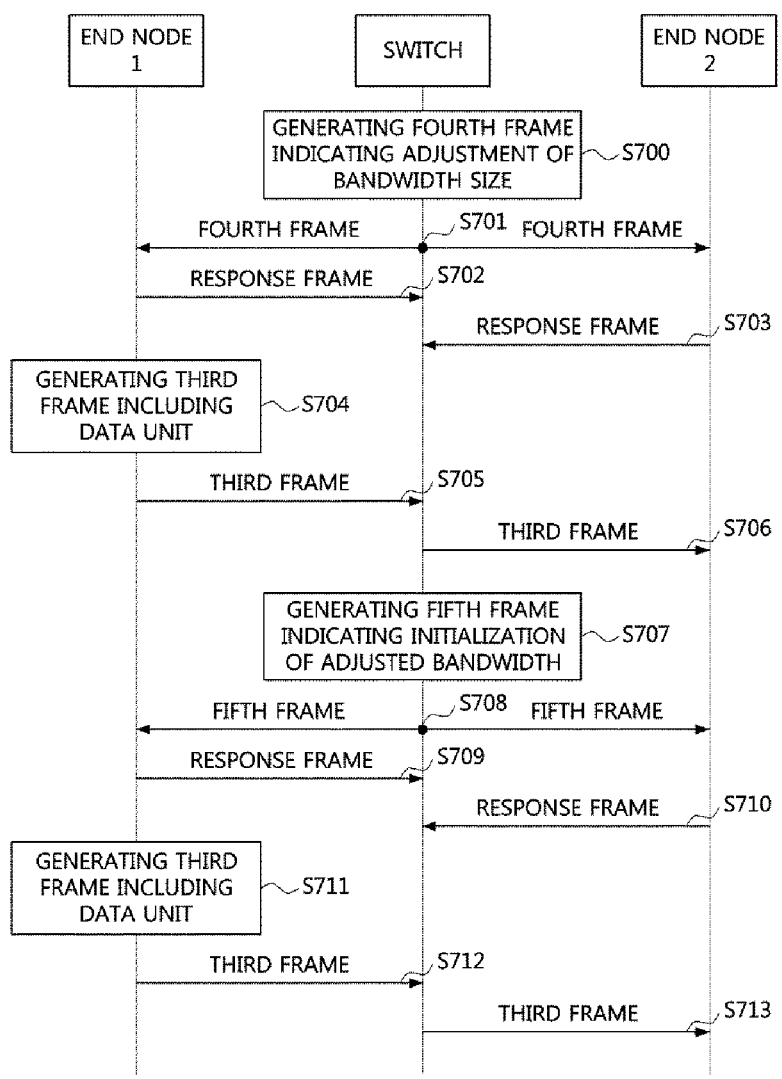
FIG. 7 is a sequence chart illustrating an operation method of a communication node according to embodiments of the present disclosure.

FIG. 7 is a sequence chart illustrating an additional operation method of a communication node according to embodiments of the present disclosure. The operation method of a communication node described in FIG. 7 may be performed after the operation method of a communication node described in FIG. 4.

As shown in FIG. 7, in case that a part of the static bandwidth needs to be used for transmitting and receiving another frame (e.g., in case that the size of the static bandwidth occupies 70% of the total bandwidth and 50% of the total bandwidth is requested for transmitting and receiving another frame), the switch may generate the fourth frame indicating that the size of the static bandwidth need to be adjusted (S700). The structure of the fourth frame may be the same as the frame described with FIG. 4. The fourth frame may include information indicating that the size of the static bandwidth need to be adjusted and information indicating a size of the adjusted static bandwidth. Such information may be included in at least one of the MAC header and the data fields in the fourth frame.

Meanwhile, the switch may transmit the fourth frame to the end node 1 and the end node 2 which are communication nodes transmitting and receiving the third frame (S701). Alternatively, the switch may transmit the fourth frame to the end node 1. In addition, the switch may transmit the fourth frame through a bandwidth other than the static bandwidth. The end node 1 may receive the fourth frame from the switch and transmit a response frame (i.e., an ACK frame) in response to the fourth frame to the switch (S702). Specifically, the end node 1 may transmit the response frame to the switch through a bandwidth other than the static bandwidth. However, the step of transmitting the response frame (S702) may be omitted. The end node 1 may identify that adjusting the size of the static bandwidth has been requested and the size of the adjusted static bandwidth, based on the information included in the fourth frame.

The end node 2 may receive the fourth frame from the switch and transmit a response frame (i.e., an ACK frame) in response to the fourth frame to the switch (S703). In addition, the end node 2 may transmit the response frame to the switch through a bandwidth other than the static bandwidth. However, the step of transmitting the response frame (S703) may be omitted. The end node 2 may identify that adjusting the size of the static bandwidth has been requested and the size of the adjusted static bandwidth, based on the information included in the fourth frame.

Afterwards, the end node 1 may generate the third frame including a data unit (S704). Specifically, the end node 1 may generate the third frame to be transmitted through the adjusted bandwidth. For example, when the size of the adjusted bandwidth occupies 50% out of the total bandwidth, the end node 1 may generate the third frame having a size corresponding to 50 µsec out of 100 µsec of the total transmission period. The end node 1 may transmit the third frame to the switch through the adjusted bandwidth (S705). The switch may receive the third frame from the end node 1 through the adjusted bandwidth and transfer the third frame to the end node 2 through the adjusted bandwidth (S706). The end node 2 may receive the third frame from the switch through the adjusted bandwidth.

The switch may generate the fifth frame notifying an initialization of the adjusted bandwidth (i.e., indicating a change from the adjusted bandwidth to the static bandwidth) (S707). The structure of the fifth frame may be the same as the frame described with FIG. 4. The fifth frame may include information notifying the initialization of the adjusted bandwidth size and may further include information indicating a time of initialization of the adjusted bandwidth. Such information may be included in at least one of the MAC header and the data fields in the fifth frame.

Meanwhile, the switch may transmit the fifth frame to the end node 1 and the end node 2 which are communication nodes transmitting and receiving the third frame (S708). Alternatively, the switch may transmit the fifth frame to the end node 1. In addition, the switch may transmit the fifth frame through a bandwidth other than the adjusted bandwidth. The end node 1 may receive the fifth frame from the switch and transmit a response frame (i.e., an ACK frame) in response to the fifth frame to the switch (S709). Specifically, the end node 1 may transmit the response frame to the switch through a bandwidth other than the adjusted bandwidth. However, the step of transmitting the response frame (S709) may be omitted. The end node 1 may identify the time of initialization of the adjusted bandwidth based on the information included in the fifth frame.

The end node 2 may receive the fifth frame from the switch and transmit a response frame (i.e., an ACK frame) in response to the fifth frame to the switch (S710). In addition, the end node 2 may transmit the response frame to the switch through a bandwidth other than the adjusted bandwidth. However, the step of transmitting the response frame (S710) may be omitted. The end node 2 may identify that the initialization of the adjusted bandwidth has been requested based on the information included in the fifth frame. Furthermore, the end node 2 may identify the time of the initialization of the adjusted bandwidth based on the information included in the fifth frame.

Afterwards, the end node 1 may generate the third frame including a data unit (S711). Specifically, the end node 1 may generate the third frame to be transmitted through the initialized bandwidth (i.e., the static bandwidth). For example, when the size of the static bandwidth occupies 70% out of the total bandwidth, the end node 1 may generate the third frame having a size corresponding to 70 µsec in case of 100 µsec of the total transmission period. The end node 1 may transmit the third frame to the switch through the static bandwidth (S712). The switch may receive the third frame from the end node 1 through the static bandwidth and transmit the third frame to the end node 2 through the static bandwidth (S713). The end node 2 may receive the third frame from the switch through the static bandwidth.

As is apparent from the above, the communication node in the Ethernet-based vehicle network may reserve the bandwidth for transmitting the first frame (e.g., the frame including a data unit generated based on the AVB protocol) and transmit the first frame to another communication node through the reserved bandwidth. In particular, the bandwidth for transmitting the first frame may be statically reserved. Thus, the communication node may transmit the first frame to another communication node using the pre-reserved static bandwidth, not reserving a bandwidth whenever transmitting the first frame.

Meanwhile, the communication node may disable the reservation of static bandwidth to be used for transmitting the first frame when the total bandwidth reserved for transmitting the first frame needs to be used for a second frame (e.g., the network diagnosis related frame, the reprogramming related frame). In particular, the communication node may transmit the second frame to another communication node through the bandwidth of which the reservation is disabled. The communication node may enable the reservation of bandwidth upon completing transmission of the second frame and may transmit the first frame through a reserved bandwidth.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

Alternatively, the communication node may adjust the size of a reserved bandwidth in case that a part of the bandwidth reserved for transmitting the first frame needs to be used for a third frame (e.g., a frame including a data unit generated based on TCP/IP). In other words, the communication node may reduce the size of a reserved bandwidth. Thus, the communication node may transmit the first frame through the reduced bandwidth and may transmit the third frame through the rest of the total bandwidth. The communication node may initialize the reduced bandwidth (i.e. increase the size of bandwidth) upon completing transmission of the second frame and may transmit the first frame through the initialized bandwidth.

While the embodiments of the present disclosure and their advantages have been described in detail above, it should be understood that various changes, substitutions and alterations may be made herein without departing from the scope of the disclosure.

What is claimed is:

1. An operation method of a first end node in an Ethernet-based vehicle network, the operation method comprising:
   transmitting a first frame which includes information indicating a reservation of a static bandwidth, a priority of a first data unit to be transmitted, and a size of the static bandwidth;
   receiving, from a second end node, a second frame indicating that preparation for receiving the first data unit is completed when the reservation of the static bandwidth indicated by the first frame is available;
   transmitting, to the second end node, a third frame including the first data unit using the static bandwidth which is reserved through an exchange of the first frame and the second frame; and
   receiving, from a switch connected to the first end node and the second end node, a fourth frame indicating that the reservation of the static bandwidth is disabled, wherein
   the static bandwidth indicates a time period,
   the first frame is a stream reservation protocol (SRP) frame advertising a presence of the first data unit,
   the fourth frame is received when a priority of a second data unit which exists in the switch is higher than the priority of the first data unit, and
   the fourth frame is transmitted from the switch to both the first end node and the second end node.

2. The operation method of claim 1, wherein the first data unit is generated based on an audio video bridge (AVB) protocol.

3. The operation method of claim 1, wherein the first frame is transmitted in a multicast manner or a broadcast manner.

4. The operation method of claim 1, wherein the first frame, the second frame, and the third frame are transmitted and received through the switch.

5. The operation method of claim 1, wherein, when the reservation of the static bandwidth is disabled, the transmission of the third frame is stopped.

6. The operation method of claim 1, wherein the fourth frame includes information indicating a period in which the reservation of the static bandwidth is disabled.

7. The operation method of claim 1, further comprising:
   receiving, from the switch, a fifth frame indicating that the reservation of the static bandwidth reservation is enabled; and
   restarting the transmission of the third frame through the static bandwidth when the fifth frame is received.

8. The operation method of claim 7, wherein the fifth frame includes information indicating a time at which the reservation of the static bandwidth is enabled.

9. An operation method of a switch in an Ethernet-based vehicle network, the operation method comprising;
   monitoring whether or not a data unit to be transmitted through a static bandwidth which is reserved for communications between a first end node and a second end node is generated;
   generating a first frame requesting that a reservation of the static bandwidth is disabled when the data unit is generated and a priority of the data unit is higher than a priority of the communications between the first end node and the second end node; and
   transmitting the first frame to the first end node and the second end node,
   wherein the static bandwidth indicates a time period.

10. The operation method of claim 9, wherein the data unit is generated based on an audio video bridge (AVB) protocol.

11. The operation method of claim 9, wherein the first frame includes information indicating a period in which the reservation of the static bandwidth is disabled.

12. The operation method of claim 9, further comprising:
    generating a second frame requesting that the reservation of the static bandwidth is enabled; and
    transmitting the second frame to the first end node and the second end node.

13. The operation method of claim 12, wherein the second frame includes information indicating a time at which the reservation of the static bandwidth is enabled.

14. An operation method of a first end node in an Ethernet-based vehicle network, the operation method comprising:
    receiving, from a second end node, a first frame which includes information indicating a reservation of a static bandwidth, a priority of a first data unit to be transmitted, and a size of the static bandwidth;
    transmitting, to the second end node, a second frame indicating that preparation for receiving the first data unit is completed when the reservation of the static bandwidth indicated by the first frame is available;
    receiving, from the second end node, a third frame including the first data unit using the static bandwidth which is reserved through an exchange of the first frame and the second frame; and
    receiving, from a switch connected to the first end node and the second end node, a fourth frame indicating that the reservation of the static bandwidth is disabled, wherein
    the static bandwidth indicates a time period,
    the first frame is a stream reservation protocol (SRP) frame advertising a presence of the first data unit,
    the fourth frame is received when a priority of a second data unit which exists in the switch is higher than the priority of the first data unit, and
    the fourth frame is transmitted from the switch to both the first end node and the second end node.

15. The operation method of claim 14, wherein the first data unit is generated based on an audio video bridge (AVB) protocol.

16. The operation method of claim 14, further comprising:
    receiving, from the switch, a fifth frame requesting that the reservation of the static bandwidth is enabled; and
    restarting a transmission of the third frame through the static bandwidth when the fifth frame is received.

17. A first end node in an Ethernet-based vehicle network, the first end node comprising:
    a processor; and
    a memory storing one or more commands executed by the processor, wherein, when the one or more commands are executed, the processor is configured to:

transmit a first frame which includes information indicating a reservation of a static bandwidth, a priority of a first data unit to be transmitted, and size of the static bandwidth;

receive, from a second end node, a second frame indicating that preparation for receiving the first data unit is completed when the reservation of the static bandwidth indicated by the first frame is available;

transmit, to the second end node, a third frame including the first data unit using the static bandwidth which is reserved through an exchange of the first frame and the second frame;

receive, from a switch which is connected to the first end node and the second end node, a fourth frame indicating that the reservation of the static bandwidth is disabled, wherein the static bandwidth indicates a time period, the first frame is a stream reservation protocol (SRP) frame advertising a presence of the first data unit, the fourth frame is received when a priority of a second data unit which exists in the switch is higher than the priority of the first data unit, and the fourth frame is transmitted from the switch to both the first end node and the second end node.

18. A switch in an Ethernet-based vehicle network, the first end node comprising:

a processor; and a memory storing one or more commands executed by the processor, wherein, when the one or more commands are executed, the processor is configured to:

monitor whether or not a data unit to be transmitted through a static bandwidth which is reserved for communications between a first end node and a second end node is generated;

generate a first frame requesting that a reservation of the static bandwidth is disabled when the data unit is generated and a priority of the data unit is higher than a priority of the communications between the first end node and the second end node; and transmit the first frame to the first end node and the second end node, wherein the static bandwidth indicates a time period.

19. A first end node in an Ethernet-based vehicle network, the first end node comprising:

a processor; and a memory storing one or more commands executed by the processor, wherein, when the one or more commands are executed, the processor is configured to:

receive, from a second end node, a first frame which includes information indicating a reservation of a static bandwidth, a priority of a first data unit to be transmitted, and a size of the static bandwidth;

transmit, to the second end node, a second frame indicating that preparation for receiving the first data unit is completed when the reservation of the static bandwidth indicated by the first frame is available;

receive, from the second end node, a third frame including the first data unit using the static bandwidth which is reserved through an exchange of the first frame and the second frame; and receive, from a switch which is connected to the first end node and the second end node, a fourth frame indicating that the reservation of the static bandwidth is disabled, wherein the static bandwidth indicates a time period, the first frame is a stream reservation protocol (SRP) frame advertising a presence of the first data unit, the fourth frame is received when a priority of a second data unit which exists in the switch is higher than the priority of the first data unit, and the fourth frame is transmitted from the switch to both the first end node and the second end node.

* * * * *